United States Patent
Kurata et al.

(10) Patent No.: US 7,365,295 B2
(45) Date of Patent: Apr. 29, 2008

(54) IMAGE INSPECTION SYSTEM FOR CORRECTING FOCAL POSITION IN AUTOFOCUSING

(75) Inventors: Shunsuke Kurata, Kamiina-gun (JP); Takahiro Komuro, Ina (JP)

(73) Assignee: Olympus Corporation, Tokyo (JP)

( * ) Notice: Subject to any disclaimer, the term of this patent is extended or adjusted under 35 U.S.C. 154(b) by 137 days.

(21) Appl. No.: 11/312,963

(22) Filed: Dec. 20, 2005

(65) Prior Publication Data
US 2006/0249651 A1 Nov. 9, 2006

(30) Foreign Application Priority Data
Dec. 24, 2004 (JP) ............................ P2004-374522

(51) Int. Cl.
G02B 27/40 (2006.01)
G06K 9/40 (2006.01)

(52) U.S. Cl. .................................. 250/201.2; 382/255
(58) Field of Classification Search ............ 250/201.2; 382/144–145, 255
See application file for complete search history.

(56) References Cited

U.S. PATENT DOCUMENTS

| | | | | |
|---|---|---|---|---|
| 6,091,075 A * | 7/2000 | Shibata et al. | ......... | 250/559.44 |
| 6,266,911 B1 * | 7/2001 | Suzuki | ......... | 42/119 |
| 2003/0012091 A1 * | 1/2003 | Yanagi et al. | ......... | 369/44.23 |
| 2003/0053676 A1 * | 3/2003 | Shimoda et al. | ......... | 382/145 |
| 2003/0133088 A1 * | 7/2003 | Okita et al. | ......... | 355/53 |
| 2005/0111089 A1 * | 5/2005 | Baer | ......... | 359/368 |
| 2005/0169515 A1 * | 8/2005 | Kobayashi et al. | ......... | 382/151 |
| 2005/0206898 A1 * | 9/2005 | Noguchi et al. | ......... | 356/400 |
| 2005/0264681 A1 * | 12/2005 | Ohta | ......... | 348/345 |

FOREIGN PATENT DOCUMENTS

| | | |
|---|---|---|
| JP | 11-095091 | 4/1999 |
| JP | 11-0249027 | 9/1999 |

* cited by examiner

Primary Examiner—Kevin Pyo
Assistant Examiner—Kevin Wyatt
(74) Attorney, Agent, or Firm—Frishauf, Holtz, Goodman & Chick, P.C

(57) ABSTRACT

An image inspection system includes a mount stage for a subject; an observation optical system for imaging light reflected by the subject; a focal position moving mechanism for relatively moving a position of the observation optical system in a depth direction of focus with respect to the subject; a mechanism for detecting a first target focal position by using light reflected by the subject; a focal position correcting device for determining a second target focal position offset from the first target focal position; a device for driving the focal position moving mechanism so as to focus on the second target focal position; and a section for storing condition setting data for each subject, which includes an offset value for determining the second target focal position. The focal position correcting device determines the second target focal position in accordance with the offset value in the condition setting data.

9 Claims, 6 Drawing Sheets

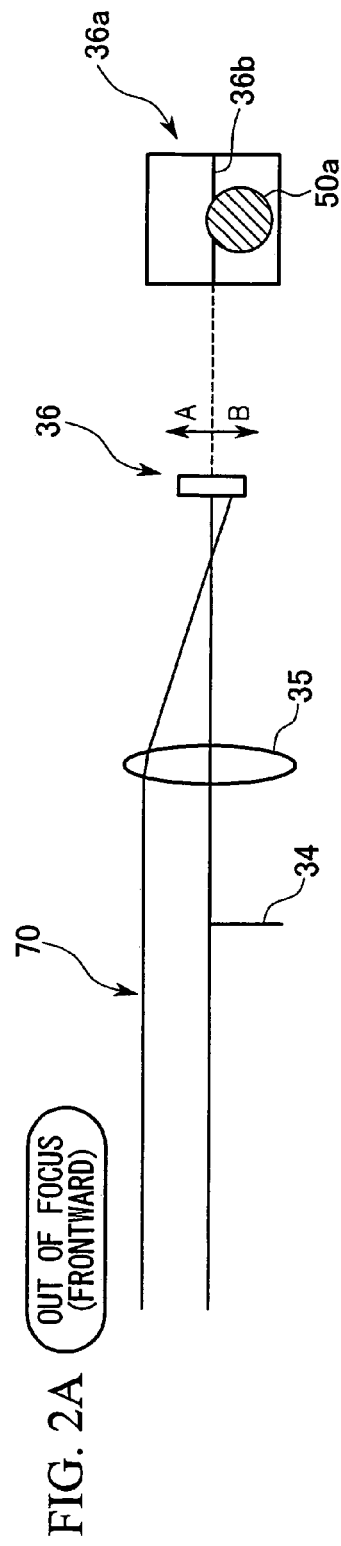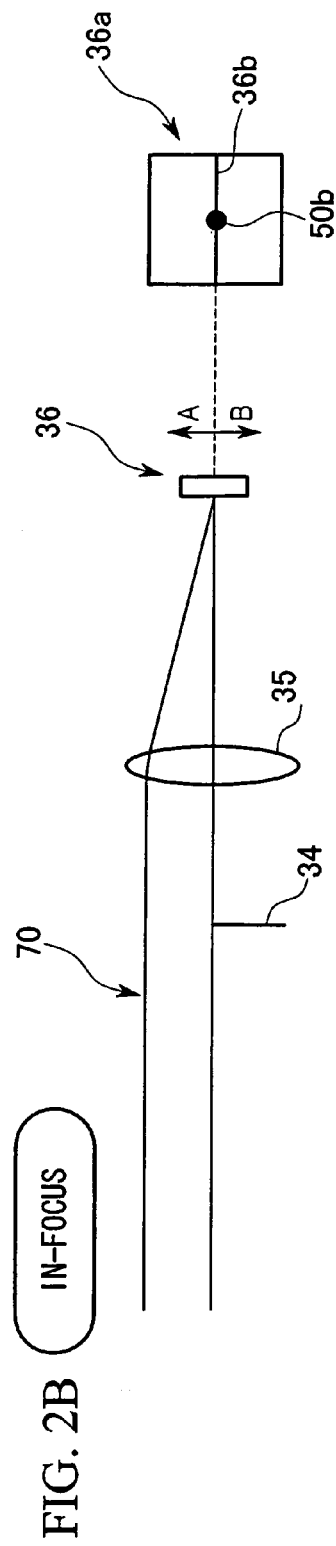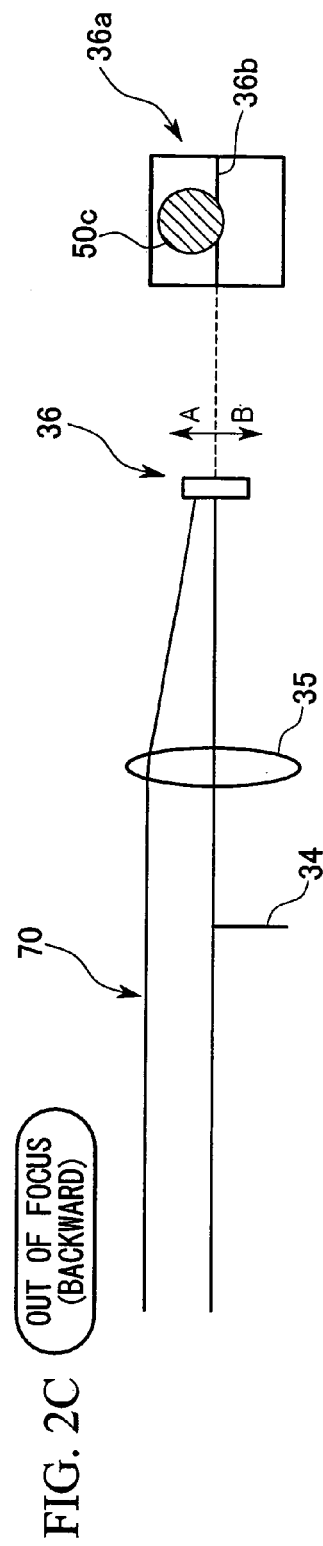

IMAGE INSPECTION SYSTEM FOR CORRECTING FOCAL POSITION IN AUTOFOCUSING

BACKGROUND OF THE INVENTION

1. Field of the Invention

The present invention relates to an image inspection system, for example, a system for inspecting images of a subject having a layered structure, such as a semiconductor wafer or a liquid crystal substrate.

Priority is claimed on Japanese Patent Application No. 2004-374522, filed Dec. 24, 2004, the content of which is incorporated herein by reference.

2. Description of the Related Art

In recent years, image inspection systems have been widely known, which are used for obtaining images of subjects to be inspected, and inspecting patterns formed on the subjects or inspecting for the presence/absence of defects or dust on surfaces of the subjects.

For example, an image inspection system used on subjects having layered structures, such as semiconductor wafers or liquid crystal substrates, is known. Such an image inspection system has an observation optical system including a microscope for obtaining an enlarged image, and an autofocusing mechanism for performing focusing of the subject by using a branch optical path separated from the observation optical system. In this system, a stage on which a subject is disposed is driven along the optical axis, so as to perform autofocusing.

For example, Reference 1 (Japanese Unexamined Patent Application, First Publication No. H11-95091, specifically, pp. 4-6, and FIGS. 1 and 2) discloses an autofocusing microscope having objective lenses which can be switchably used. The autofocusing microscope employs a knife-edge focusing method for detecting a focal point by irradiating a subject with laser light. The autofocusing microscope has an autofocusing optical system branching away from an observation optical system, in which a series of color compensating lenses for correcting chromatic aberration of each objective lens is movably provided. An amount of correction assigned to each objective lens is stored in a ROM. When the objective lens is switched, the focal point is also switched with reference to the ROM.

Reference 1 also discloses that when the operator would like to observe a specific part of a subject which has structural steps, the autofocusing mechanism is used for focusing on the specific part by setting an offset value.

SUMMARY OF THE INVENTION

The present invention provides an image inspection system comprising:

a mount stage on which a subject to be inspected is mounted;

an observation optical system for imaging light reflected by the subject so as to observe the object;

a focal position moving mechanism for relatively moving a position of the observation optical system in a depth direction of focus with respect to the subject on the mount stage;

a focal position detecting mechanism for detecting a first target focal position with respect to the subject by using light reflected by the subject;

a focal position correcting device for determining a second target focal position with respect to the subject, wherein the second target focal position is offset from the first target focal position;

a driving device for driving the focal position moving mechanism so as to focus on the second target focal position; and a storage section for storing condition setting data for each subject, which includes at least one offset value for determining the second target focal position, wherein the focal position correcting device determines the second target focal position in accordance with one of said at least one offset value in the condition setting data.

BRIEF DESCRIPTION OF THE DRAWINGS

FIGS. 2A to 2C are diagrams explaining a principle of detection of the focal position by using the knife edge method and respectively showing optical paths and light rays on a photodetecting surface in an out-of-focus state (frontward), an in-focus state, and an out-of-focus state (backward).

DESCRIPTION OF THE PREFERRED EMBODIMENTS

Figure 1:
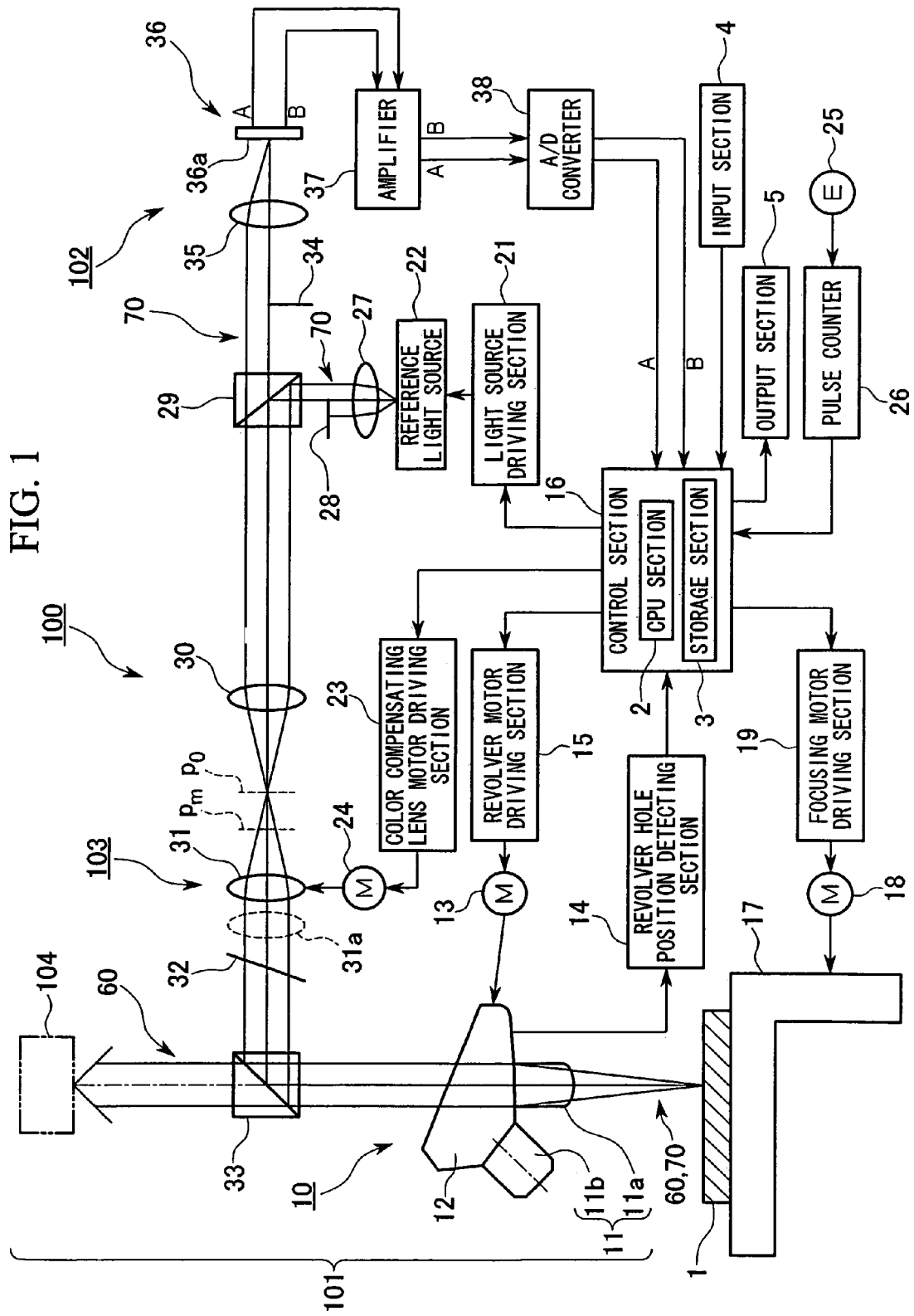
FIG. 1 is a diagram showing the general structure of an image inspection system as a first embodiment in accordance with the present invention.

Hereinafter, embodiments according to the present invention will be described with reference to the appended figures. In the figures, identical or corresponding parts have the same reference numeral or symbol, and duplicative explanations are omitted.

First Embodiment

An image inspection system as a first embodiment in accordance with the present invention will be explained.

FIG. 1 is a diagram showing the general structure of an image inspection system 100 of the first embodiment.

The image inspection system 100 has a control section 16, an input section 4, an output section 5, a specimen moving stage 17 (i.e., a mount stage), a focusing motor 18 (i.e., a focal position moving mechanism), a focusing motor driving section 19 (i.e., a driving device), an observation optical system 101, a color compensating device 103 (i.e., a focal position correcting device), and a focal position detecting section 102 (i.e., a focal position detecting mechanism).

The image inspection system 100 obtains an image by autofocusing on a surface layer of a substrate 1 as a subject to be inspected, thereby performing magnified observation.

This system is preferably applied to inspection for presence or absence of surface defects.

The kind of the substrate 1 is not limited. Below, a substrate having a layered structure or steps (e.g., a semiconductor wafer or a liquid crystal substrate) is explained as an example.

The substrate 1 has a regularly-repeated pattern (e.g., a wiring pattern) formed by photolithography, and such patterns are stacked vertically (i.e., in the thickness direction).

Therefore, generally, each substrate 1 is subjected to surface defect inspection (e.g., a macro or a micro inspection) for each manufacturing process, where the wiring pattern, the film thickness, or the material of the surface layer when inspection is performed is not uniform as a result of the manufacturing process.

In consideration of the above circumstances, condition information (i.e., condition setting data which may be called "recipe") corresponding to each state of the substrate 1 is prepared, in which conditions for inspection, such as the kind, the method, and the procedure of inspection, are described. The condition information is stored in an appropriate storage section while a condition identification number corresponding to each state of the substrate 1 is assigned to each condition information.

The condition information used in the image inspection system 100 includes an offset value for correcting the focal position, as a condition for inspection.

The condition information can be prepared by the control section 16 which performs general control of the image inspection system 100, or may be prepared by another device which transfers the prepared data to the control section 16 as a file having a format readable by the control section 16. The control section 16 can use the transferred data directly or after correcting the data.

The control section 16 has a CPU section 2 and a storage section 3, and the input section 4 and the output section 5 are connected to the control section 16. The input section 4 may include an input device such as a keyboard, a mouse, or a touch panel, an input port connected to an appropriate communication line so as to receive data transmitted through the communication line, and a reading device for a removable medium such as a CD or a DVD. The output section 5 may include a monitor. Control of various operations, such as preparation or correction of condition information, is performed by a program loaded in memory of the CPU section 2. The input section 4 may include not only devices necessary for preparing or correcting the condition information but also operation input devices necessary for inspection, for example, an objective lens switching device for changing observation magnification, or an autofocusing switch for making autofocusing active or inactive.

In the present embodiment, the condition information is stored in the storage section 3. Instead, an appropriate external storage device may be used, which is connected to the control section 16.

Typically, when the substrate 1 is installed in the image inspection system, condition information corresponding to the present manufacturing process or the like of the substrate 1 is retrieved by the control section 16 from the storage section 3 (or another storage device) in the memory of the CPU section 2, and is referred to by a program loaded in the CPU section 2.

In order to prepare condition information using the control section 16, the operator may input values or select data from among choices by using the input section 4.

In order to correct the condition information, the condition information retrieved from the storage section 3 is displayed in the output section 5 having a monitor or the like, and corrected data is input via the input section 4.

The specimen moving stage 17, on which the substrate 1 is disposed as a subject to be inspected, is a movable mechanism in which horizontal movement for moving the inspected part and vertical movement along the thickness of the substrate 1 are possible.

Each movement can be manually performed by transmitting an amount of movement by rotating a jog encoder 25 and counting the number of rotations using a pulse counter 26, or automatically performed based on the condition information or a control signal from the control section 16. Automatic vertical movement (i.e., along the thickness direction) for autofocusing is performed by transmitting a driving force output from the focusing motor 18 via a power transmitting mechanism (not shown).

The focusing motor 18 is connected to the focusing motor driving section 19 which is connected to the control section 16, and the focusing motor 18 is driven in accordance with a control signal output from the control section 16.

The observation optical system 101 is a microscope for observing a magnified image of the substrate 1 disposed on the specimen moving stage 17, by visible light epi-irradiation (not shown in FIG. 1) The system generally consists of an electric revolver 10 having objective lenses 11 and an observation section 104.

The observation section 104 has an eyepiece unit and an imaging unit for performing photoelectric conversion of an observed image (units not shown).

The electric revolver 10 has a revolver main body 12 which is rotationally driven by a revolver motor 13, and objective lenses 11a, 11b, . . . which are provided on the revolver main body 12 and have different magnifications. Revolver holes (not shown) for detecting respective positions of the objective lenses 11a, 11b, . . . are provided on the revolver main body 12.

A revolver hole position detecting section 14 detects the kind and the position of each revolver hole provided on the rotationally-driven revolver main body 12 by using an appropriate sensor such as an optical sensor, and outputs a detection signal to the control section 16.

The revolver motor 13 is connected to a revolver motor driving section 15 which is connected to the control section 16.

The control section 16 sends a control signal to the revolver motor driving section 15 so as to set an objective lens 11, which has an image magnification suitable for an inspected part, on an optical path of the observation optical system 101 based on the condition information. The control section 16 can confirm that the relevant objective lens 11 has been set, with reference to a detection signal output from the revolver hole position detecting section 14.

In the following descriptions, when no specific explanation is provided, the objective lens 11a is basically arranged on the optical axis of the observation optical system 101, and the objective lens 11 is every objective lens provided on the electric revolver 10.

On the optical path between the electric revolver 10 and the observation optical system 104, a light branching device is provided, so as to transmit observation light 60 and reflect detection light 70, which is used for autofocusing, toward the outside of the optical path. In the present embodiment, the observation light 60 is visible light, and the detection light 70 is invisible and infrared light (having a wavelength $\lambda$), and a dichroic mirror 33 is used as the light branching device.

The dichroic mirror 33 makes infrared light, which is input in a direction intersecting the optical path of the observation optical system 101, incident on the optical axis of the observation light 60, and makes visible light from the substrate 1 propagate along the optical axis and reflects only infrared light from the substrate 1 so as to make the infrared light branch away from the optical path of the observation optical system 101.

On a branch optical path branching away via the dichroic mirror 33, a λ/4 plate 32, a color compensating device 103, and a focal position detecting section 102 are arranged, in this order.

The λ/4 plate 32 is an optical element for transmitting linearly-polarized light having a specific wavelength so as to produce circularly-polarized light, and for receiving circularly-polarized light incident from the opposite side and converting the circularly-polarized light to linearly-polarized light having a polarization direction which has been rotated by 90 degrees, and outputting the converted linearly-polarized light.

The color compensating device 103 has a set of color compensating lenses 31 (i.e., an optical correction element) which is movably supported along the optical axis and is used for focusing light branching away via the dichroic mirror 33 onto a reference image surface $p_0$. Movement of the set of color compensating lenses 31 is performed using a color compensating lens motor 24 connected to a color compensating lens motor driving section 23.

The color compensating lens motor driving section 23 is connected to the control section 16, and controls an amount of movement using the color compensating lens motor 24 in accordance with a control signal output from the control section 16.

In an initial state of inspection, the set of color compensating lenses 31 is arranged in consideration of chromatic aberration of each objective lens 11 along the optical axis so that an image surface of the focused detection light 70 coincides with a specific reference image surface $p_0$. The positions in the arrangement are independent of the condition information and are stored in the storage section 3. The stored data are retrieved when the image inspection system 100 is initialized. When the objective lens 11 is switched, the set of color compensating lenses 31 is automatically rearranged.

The set of color compensating lenses 31 is moved in accordance with the control signal output from the control section 16, so that light from the substrate 1 can be focused on a corrected image surface $p_m$ which is offset from the reference image surface $p_0$.

In this case, when the set of color compensating lenses 31 is rearranged by switching the objective lens 11, relative rearrangement based on the offset position is performed, so as to maintain a constant corrected image surface $p_m$.

The focal position detecting section 102 is provided for emitting the detection light 70, which has a specific wavelength λ within an infrared range, to the substrate 1 via the color compensating device 103, the dichroic mirror 33, and the objective lens 11a, and receiving light reflected by the substrate 1, thereby detecting the focal position. The present embodiment uses a detection mechanism which employs what is called the "knife edge" method.

Generally, the focal position detecting section 102 has a set of condenser lenses 30, a polarization beam splitter (PBS) 29, a reference light source 22 (i.e., a light source for detection), an emission-side stopper 28, a reception-side stopper 34, a set of condenser lenses 35, and a photodetector 36.

The set of condenser lenses 30 is an optical element for converting light, which is imaged (i.e., focused) by and received from the set of color correcting lenses 31, to substantially parallel light, and for imaging parallel light, which is incident on the set of condenser lenses 30, and making the imaged light incident onto the set of color correcting lenses 31.

The PBS 29 is provided for switching the optical path of light having the wavelength λ in accordance with a polarization component thereof. For example, a polarization coating for transmitting substantially 100% of a p-polarized component and reflecting substantially 100% of a s-polarized component is applied to a beam-splitting surface of the PBS 29.

The reference light source 22 is provided for making the detection light 70 having the wavelength λ incident on the PBS 29, and may be a semiconductor laser light source. The linearly-polarized component is a p-polarized component (polarized in a direction perpendicular to the paper of FIG. 1), so as to prevent loss in a quantity of light through the PBS 29.

On the optical path between the reference light source 22 and the PBS 29, a collimating lens 27 and the emission-side stopper 28 are provided. The collimating lens 27 is used for converting light emitted from the reference light source 22 to parallel light, and the emission-side stopper 28 is used for excluding half of the parallel light by shielding a part from the optical axis to an end in a section perpendicular to the optical axis.

The reception-side stopper 34 is a shielding member for excluding light other than the detection light 70 in correspondence to the excluded portion of the detection light 70, which is excluded by the emission-side stopper 28.

The set of condenser lenses 35 is an optical element for focusing the detection light 70 which is emitted onto the substrate 1 and then transmitted through the objective lens 11a, the dichroic mirror 33, the set of color correcting lenses 31, the set of condenser lenses 30, and the PBS 29.

The photodetector 36 is a photodetection sensor for receiving light, which is focused by the set of the condenser lenses 35, at a specific position on the optical axis, so as to detect a light-receiving position along a direction perpendicular to the optical axis.

Such a photodetection sensor may be a CCD or a PSD; however, in the present embodiment, a bi-cell PD is used. More specifically, the photodetector 36 has a photodetecting surface 36a (i.e., a position detection reference surface) which is divided into an area A and an area B, and displacement from a boundary 36b (see FIGS. 2A to 2C) can be computed by comparing detection output signals A and B which are respectively proportional to quantities of light in corresponding areas.

In the photodetecting surface 36a, the boundary 36b between the two divided areas coincides with the optical axis, and the photodetecting surface 36a and the reference image surface $p_0$ are optically conjugate with each other in the depth direction along the optical axis. Therefore, when being focused, the detection light 70 is imaged on the boundary 36b between the two areas.

The detection output signals A and B are respectively sent to an amplifier 37 and amplified, and then transmitted to an A/D converter 38 so as to be converted to digital signals, which are then input into the control section 16.

The control section 16 computes a displacement Δ of the detection light 70 using the following formula (1).

$$\Delta = (A-B)/(A+B) \qquad (1)$$

Below, the operation of the image inspection system 100 will be explained. In particular, autofocusing operation performed for obtaining an image of an inspected part will be explained.

Figure 3:
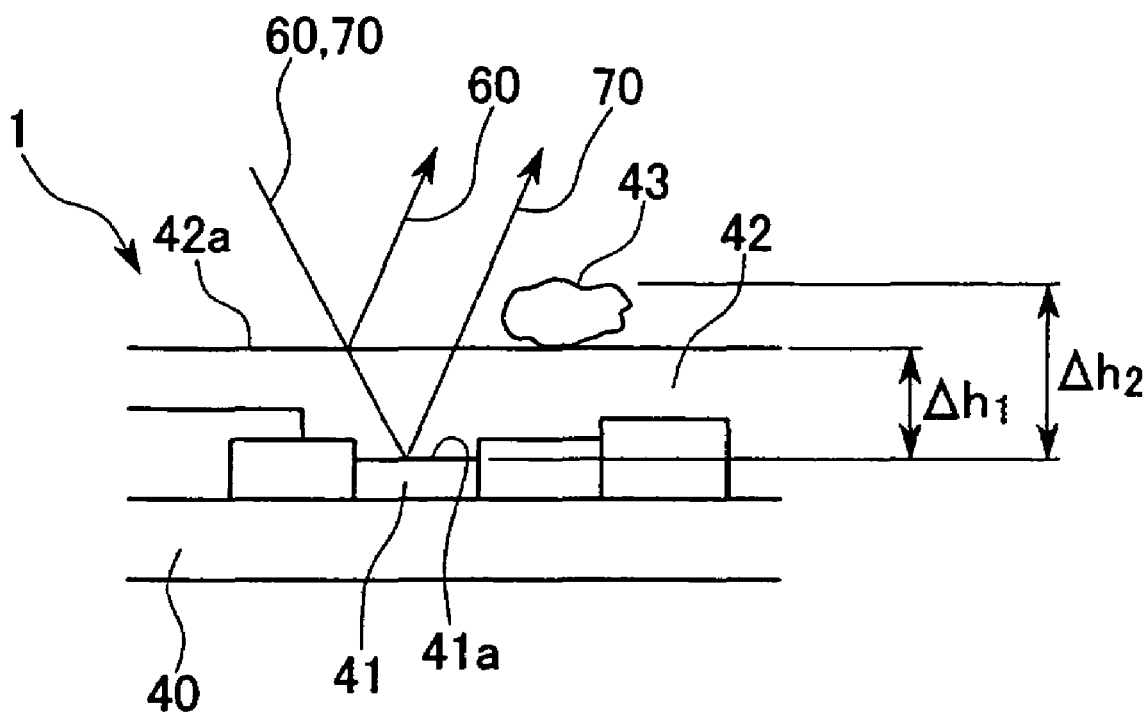
FIG. 3 is a diagram explaining an example of input and output of observation light and detection light to and from a subject to be inspected.

FIGS. 2A to 2C are diagrams for explaining a principle of detection of the focal position by using the knife edge method. FIGS. 2A, 2B, and 2C respectively indicate optical paths and light rays on the photodetecting surface in an out-of-focus state (frontward), an in-focus state, and an out-of-focus state (backward). FIG. 3 is a diagram explaining an example of input and output of the observation light 60 and the detection light 70 to and from a subject to be inspected.

As shown in FIG. 1, the detection light 70 is emitted from the reference light source 22, where the quantity of the detection light 70 is set to a specific value by a light source driving section 21. The emitted detection light 70 is converted to parallel light by the collimating lens 27, and half of the collimated light (measured from the optical axis) is cut out by the emission-side stopper 28, and the remaining light is incident on the PBS 29.

In accordance with the reference light source 22, the detection light 70 is p-polarized; thus, substantially 100% of the light incident on the PBS 29 is reflected by the PBS 29 and is incident on the set of condenser lenses 30. The light is then focused by the set of condenser lenses 30 and imaged on the reference image surface $p_0$, and then diverged and incident on the set of color compensating lenses 31.

The detection light 70 is converted to parallel light by the set of color compensating lenses 31 and then converted into circularly-polarized light through the $\lambda/4$ plate 32. The circularly-polarized light is incident on the dichroic mirror 33.

The dichroic mirror 33 reflects light having the wavelength $\lambda$; thus, the detection light 70 proceeds along the optical axis of the observation optical system 101, and is focused by the objective lens 11a onto the substrate 1.

When the detection light 70 is reflected by the substrate 1, the reflected light passes the above-described optical path in the opposite direction. That is, the reflected light is converted to parallel light by the objective lens 11a and reflected by the dichroic mirror 33 and then incident on the $\lambda/4$ plate 32.

In the above process, the detection light 70 is converted into linearly-polarized light; however, this linearly-polarized light has a polarization direction which has been rotated by 90 degrees with respect to the polarization direction of the previous linearly-polarized detection light 70 directed to the substrate 1. That is, the detection light 70 is converted into s-polarized light and is then made incident on the set of color compensating lenses 31.

The light is focused by the set of color compensating lenses 31 and then diverged and made incident on the set of condenser lenses 30, by which the light is converted to substantially parallel light which is incident onto the PBS 29.

As the detection light 70 has been converted to s-polarized light, substantially 100% of the detection light 70 passes through the PBS 29 and is incident on the set of condenser lenses 35. The light is then focused on the photodetecting surface 36a.

Conventional autofocusing is performed based on the following principle.

When a surface of the substrate 1, on which the detection light 70 is focused through the objective lens 11a, coincides with an actual reflection surface (i.e., a surface to be observed in the substrate 1), the reflected detection light 70 proceeds along the optical path in the direction opposite to that of the previous detection light 70 directed to the substrate 1, and is imaged on the reference image surface $p_0$ and is also imaged on the photodetecting surface 36a which is optically conjugate with the reference image surface $p_0$. Therefore, as shown in FIG. 2B, a minute spot 50b is formed on the boundary 36b.

Conversely, when the emitted detection light 70 is reflected at a defocused position, the reflected light is imaged at positions away from the reference image surface $p_0$ and the photodetecting surface 36a. As described above, half of the detection light 70 is excluded by the emission-side stopper 28 and the reception-side stopper 34. Therefore, as shown in FIGS. 2A and 2C, in accordance with the defocusing direction, a spot (50a or 50c) having a relatively large size is produced in the area B or A in the out-of-focus state (frontward or backward).

Based on the formula (1), the displacement $\Delta$ is computed, and the focusing motor 18 is driven so as to make the displacement $\Delta$ zero in the in-focus state, thereby performing autofocusing for vertically adjusting the position of the specimen moving stage 17.

No problem occurs as long as the observation light 60 and the detection light 70 are each reflected by the same surface. However, reflection surfaces of the observation light 60 and the detection light 70 may be different from each other because of a difference between the wavelengths of the light 60 and the light 70. For example, in the substrate 1 shown in FIG. 3, an uneven layer 41 is formed on a base substrate 40, and a layer 42 is further disposed on the layer 41 in the last manufacturing process. In order to perform inspection for the last manufacturing process, it is appropriate to focus on and observe an upper surface 42a of the layer 42.

However, depending on the materials of the layers 41 and 42, the visible observation light 60 may tend to be reflected by the upper surface 42a of the layer 42 while the infrared detection light 70 may tend to pass through the layer 42 and be reflected by a boundary surface 41a between the layers 41 and 42. In this case, in accordance with the above-described principle of detection depending on the quantity of light, focusing with $\Delta=0$ should be obtained at the boundary surface 41a where the quantity of the detection light 70 is large. That is, the boundary surface 41a is the target focal position (i.e., the first target focal position), and an image of the upper surface 42a is defocused.

In the present embodiment, in order to set a desired observation position as a target focal position (i.e., the second focal position), an offset value $\Delta h_1$ for correcting the focal position is included in the condition information for the substrate 1.

When starting inspection of the substrate 1, conditions for inspection are set based on the condition information, and the offset value $\Delta h_1$ for each part to be inspected is loaded on the storage section 3 of the control section 16.

Before starting autofocusing, the control section 16 moves the set of color compensating lenses 31 along the optical axis (see dotted circle 31a in FIG. 1) in accordance with the offset value $\Delta h_1$, so that the reference image surface $p_0$ is shifted to the corrected image surface $p_m$. Accordingly, the target focal position with $\Delta=0$ is set to the second target focal position. Here, the color compensating device 103 also functions as a focal position correcting device for setting the second target focal position.

The above-described autofocusing is then performed. After the inspection, the set of color compensating lenses 31 is again moved so as to retrieve the reference image surface $p_0$.

The position of the corrected image surface $p_m$ is determined by computing an amount of movement corresponding to the amount of movement $\Delta h_1$ of the object surface, based on magnification of an optical system which includes the objective lens 11a and the set of color compensating lenses 31.

When the first target focal position is a desired position to be observed, $\Delta h_1$ is set to be zero.

The first target focal position depends on the detection method used in the focal position detecting section 102 and optical characteristics of each layer of the subject, and thus can be specified in advance in accordance with the structure of the substrate 1 and conditions of each manufacturing process. If necessary, the first target focal position can be experimentally specified when conditions of inspection, which are included in the condition information, are set, or when a manual inspection is performed.

Similarly, the offset value $\Delta h_1$ can be determined in advance and stored as condition information. The offset value $\Delta h_1$ may be determined based on a design value of the thickness of the layer 42 deposited on the layer 41.

In this case, preferably, the offset value is automatically computed by a correction value computing section provided in the control section 16, so as to input design conditions of the substrate 1 such as CAD data, analyze the design conditions, and compute necessary values such as a layer thickness of each part to be inspected, or reflectance and transmittance of each layer. In the present embodiment, the control section 16 functions as a design condition reference section and the correction value computing section.

Regarding the analysis of the design conditions, similarly to in the above-described example, the first target focal position may be determined by comparing reflectance of the observation light 60 on the upper surface 42a with reflectance of the detection light 70 on the boundary surface 41a, and an appropriate second target focal position may be computed based on the condition information, thereby determining the offset value by computing a vertical difference between the first and the second target focal positions.

In accordance with the above structure, time necessary for computation or input of the offset value can be saved.

In addition, instead of using the correction value computing section for allover automatic computation, an offset value input assistance section may be provided for displaying design conditions (input via the input section 5) using the output section 5 after appropriately converting or arranging the design conditions for the convenience of the operator, and for allowing the operator to perform interactive input operations with respect to the displayed data so as to determine the offset value.

It is unnecessary for the offset value $\Delta h_1$ to precisely coincide with the relevant design value, and for example, in the example shown in FIG. 3, the offset value $\Delta h_1$ can be freely set while the upper surface 42a is within the depth of field.

The offset value $\Delta h_1$ may be experimentally set so as to consider dispersion in optical characteristics.

The second target focal position is not necessarily defined at a boundary surface between layers. For example, as shown in FIG. 3, when dust 43 tends to stick to the upper face 42a, inspection for obtain a fine image of the dust 43 for feature extraction or the like may be necessary for determining the kind of the dust 43. In this case, an offset value $\Delta h_2$ may be set by adding an expected height of the dust 43 to $\Delta h_1$, thereby obtaining a fine image of the dust 43.

In addition, the dust 43 may be stuck to the boundary surface 41a when the layer 42 is formed. In such a case, instead of $\Delta h_1$, the height of the dust 43 may be used as the offset value.

In accordance with the image inspection system 100 of the present embodiment, the focal position in autofocusing can be corrected based on the offset value stored as data of the condition information. Therefore, even when the kind of the subject to be inspected or the manufacturing process is changed, the focal position can be corrected to an appropriate position. Accordingly, it is unnecessary to manually correct the focal position of a part to be inspected, and it is possible to quickly obtain a desired image, thereby improving the efficiency of inspection.

In the present embodiment, the target focal position in autofocusing is changed; thus, time necessary for correcting the focal position is almost zero, thereby allowing the quick performance of autofocusing.

In addition, the color compensating device and the focal position correcting device are implemented by a single device, thereby providing a simple system structure.

Below, a first variation of the present embodiment will be explained.

In the above-described embodiment, the offset value is set for each part to be inspected. However, in the present variation, the second target focal position is common between a plurality of inspected parts within a predetermined area, and a coordinate rage of the predetermined area is stored. Based on positional coordinates of each part to be inspected, it is determined which area each part belongs to, and an offset value corresponding to the determined area is set.

Figure 4A:
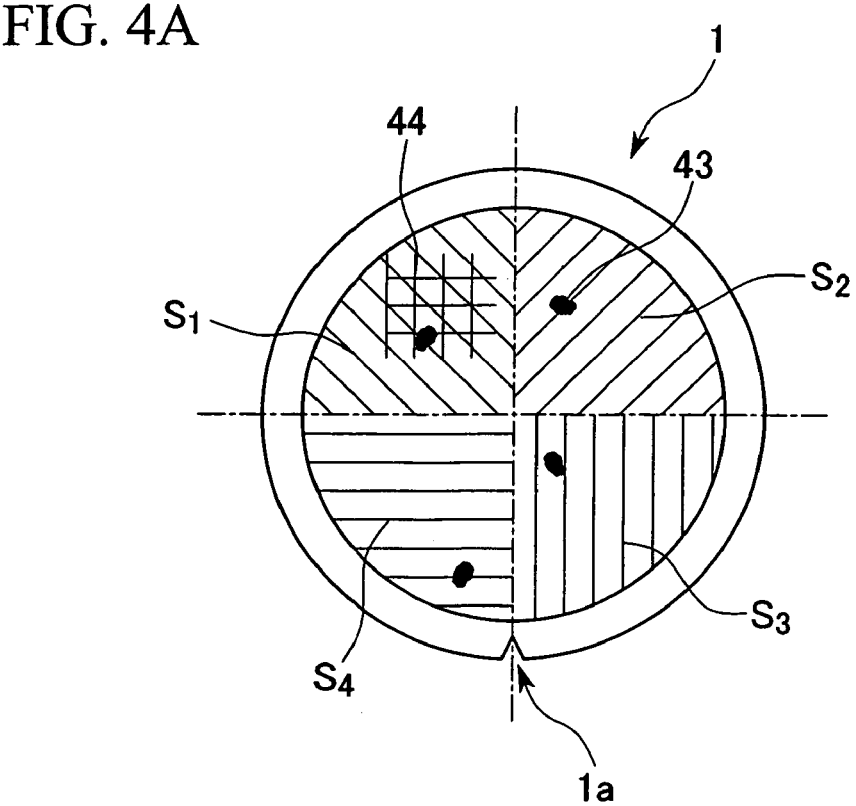
FIGS. 4A and 4B are plan views of a subject to be inspected, for explaining a first variation of the first embodiment.
Figure 4B:
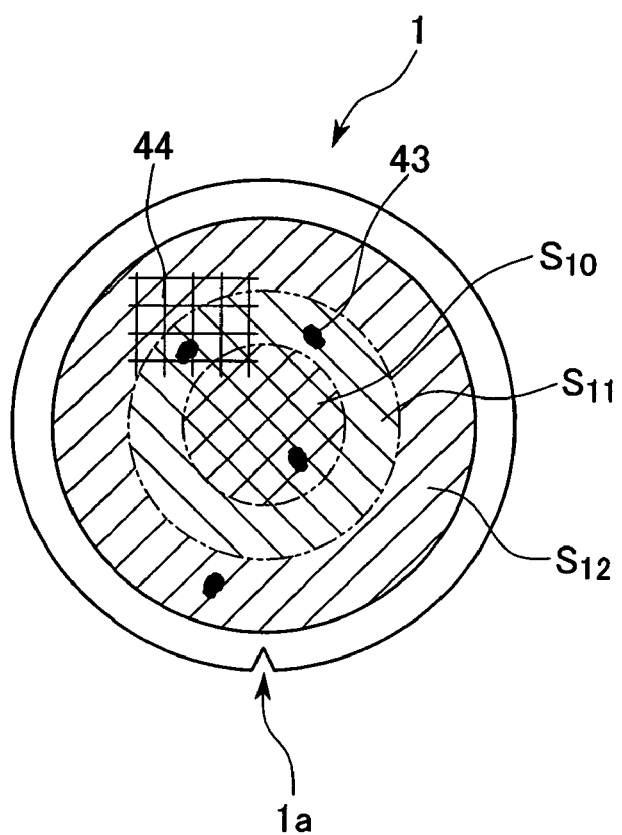

FIGS. 4A and 4B are plan views of a subject to be inspected, for explaining the first variation of the first embodiment.

Here, the substrate 1 is a circular semiconductor wafer which is divided into a plurality of rectangular dies 44 (see FIG. 4A). Each die 44 has a predetermined size and can be designated by indicating boundary points between relevant areas, for example, by coordinates (x, y) with respect to a notch 1a as a positional reference.

In the substrate 1, the predetermined area may be the area of each die 44, or an area including a plurality of dies 44. For example, as shown in FIG. 4A, areas $S_1$, $S_2$, $S_3$, and $S_4$ may be employed, which are provided by dividing the whole area of the substrate 1 into four sections by lines passing through the center of the substrate 1. Instead, as shown in FIG. 4B, areas $S_{10}$, $S_{11}$, and $S_{12}$ may be employed, which are provided by coaxially dividing the whole area of the substrate 1. Either case is convenient, for example, when it is known in advance that the thickness of the layer or the rate of sticking of dust is not uniform due to the manufacturing method used.

When different offset values are assigned to predetermined areas as described above, the amount of stored data for the offset values can be reduced, thereby reducing the computation time and allowing the performance of efficient inspection.

The size or the shape for division of each predetermined area is not limited to the above and can be flexibly defined. For example, the present method is preferably applied to a liquid crystal substrate or the like, in which depending on arrangement or the like when a plurality of substrates are obtained from a single base substrate, a wiring direction of a circuit pattern may be changed on the base substrate, or different kinds of substrates are to be simultaneously manufactured.

Below, a second variation of the present embodiment will be explained.

In the above-described embodiment, the offset value is determined based on design conditions. However, in the present variation, the offset value is determined based on an actually measured value of the layer thickness of the subject.

Figure 5:
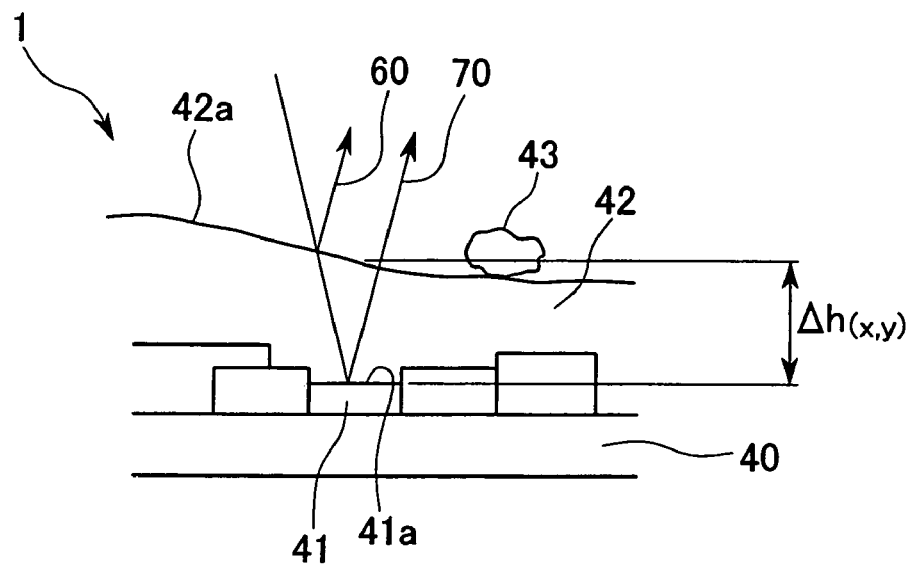
FIG. 5 is a diagram explaining an example of the input and the output of each of observation light and detection light with respect to the subject, in a second variation of the first embodiment.
Figure 6:
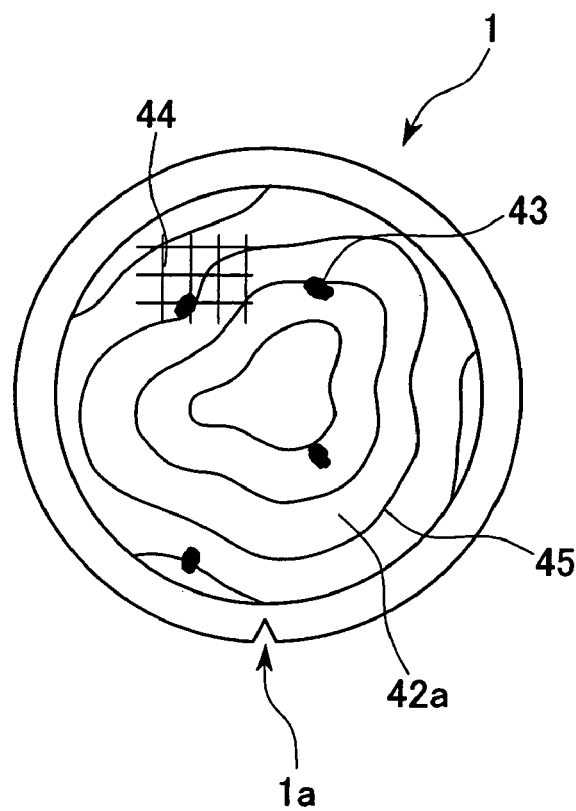
FIG. 6 is a plan view of the subject for explaining the second variation.

FIG. 5 is a diagram explaining an example of the input and the output of each of the observation light 60 and the detection light 70 with respect to the subject, in the second variation of the first embodiment. FIG. 6 is a plan view of the subject for explaining the second variation.

As shown in FIG. 5, the thickness of the layer 42 of the substrate 1 is not uniform because of the manufacturing process. Generally, the thickness of the layer may decrease from the center to the outer periphery, as shown by contour lines 45 in FIG. 6.

In the present variation, before the image inspection, the thickness of the layer 42 is measured using a film thickness measurement tool or the like, and measured data is input as layer thickness data (i.e., a measured value) via the input section 4 and is stored into the storage section 3 by the control section 16.

A correction value computing section is provided in the control section 16, so as to refer to the layer thickness data and the condition information (if necessary) and to compute the offset value. The correction value computing section computes a function $\Delta h (x, y)$ for the offset value, which corresponds to the coordinates (x, y) of each inspected part, and the computed data is stored as data of the condition information in the storage section 3. Specifically, the data may be stored as a table of numerical values corresponding to parts to be inspected, or a set of coefficients indicating the form of the function $\Delta h (x, y)$. The control section 16 functions as both the measured value reference section and the correction value computing section.

Every substrate 1 may be subjected to such layer thickness inspection. If the measurement process is stable, data obtained by sampling inspection may be used.

In accordance with the present variation, an accurate offset value can be obtained in consideration of dispersion in manufacturing of the subjects. Therefore, it is possible to highly-accurately focus on the focal position which should be observed, thereby improving inspection accuracy.

Second Embodiment

Below, an image inspection system as a second embodiment of the present invention will be explained.

Figure 7:
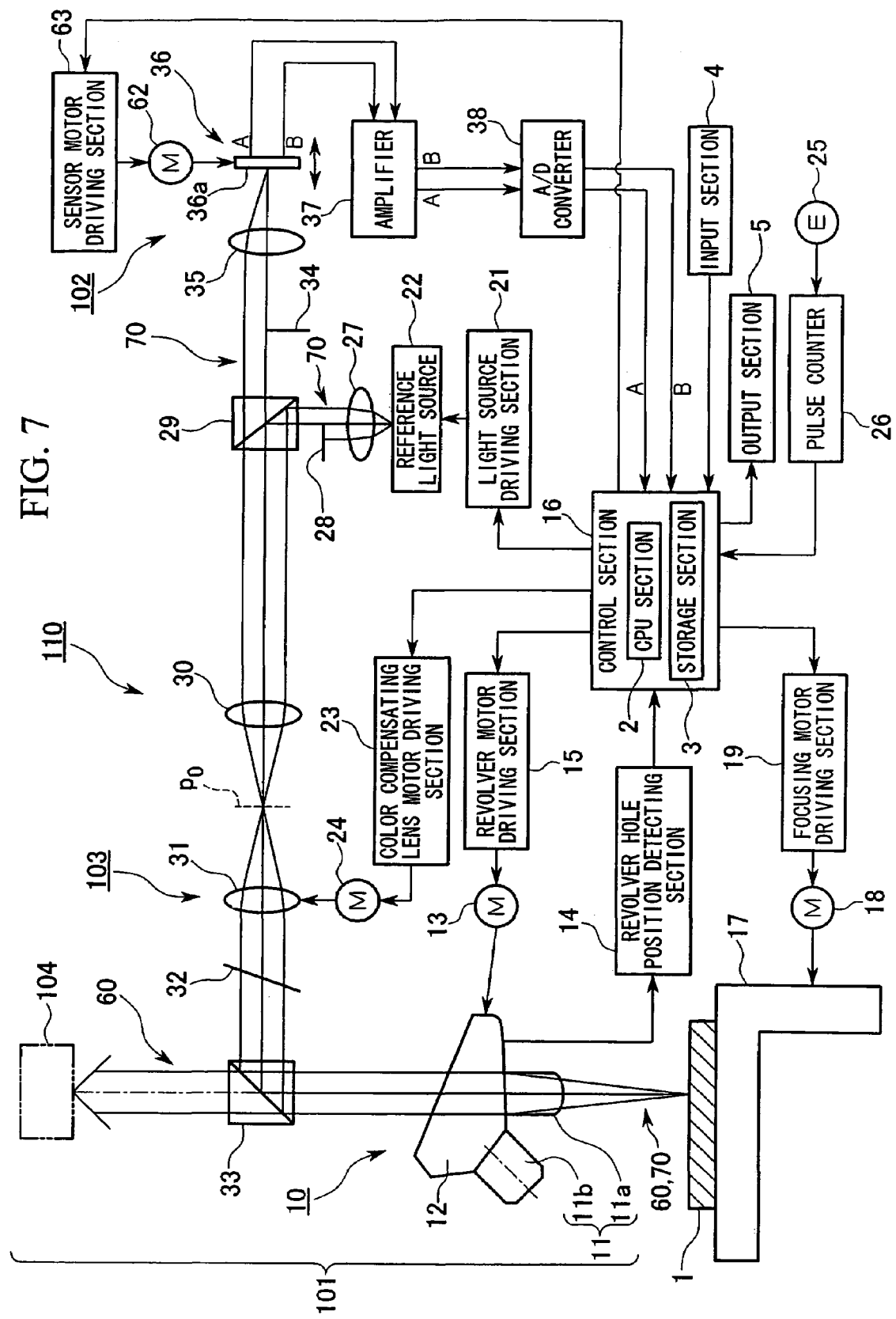
FIG. 7 is a diagram showing the general structure of an image inspection system as a second embodiment in accordance with the present invention.

FIG. 7 is a diagram explaining the general structure of an image inspection system 101 of the second embodiment.

The image inspection system 101 is obtained by adding a sensor motor 62 and a sensor motor driving section 63 to the image inspection system 100 of the first embodiment.

In the following simple explanation, distinctive features in comparison with the first embodiment are mainly described.

The sensor motor 62 is provided for moving the attached photodetector 36 along the optical axis via an appropriate movement mechanism.

The sensor motor driving section 63 is provided for driving the sensor motor 62 based on a control signal output from the control section 16.

In the present embodiment, the above added structural elements function as the focal position correcting device. In the first embodiment, the color compensating device 103 also functions as the focal position correcting device.

In the present embodiment, the color compensating device 103 is used as an original color compensating device, so as to maintain a constant reference image surface $p_0$ even when the objective lens 11 is switched to another objective lens 11 having a different chromatic aberration.

Therefore, in the above-described example state in which the first target focal position is present on the boundary surface 41a (see FIG. 3), in order to set the second target focal position on the upper surface 42a in accordance with the offset value $\Delta h_1$ stored as condition information, the sensor motor 62 is driven so as to move the photodetecting surface 36a away from the set of condenser lenses 35, by a distance optically equivalent to $\Delta h_1$.

As described above, the present embodiment employs devices for changing the target focal position in autofocusing, which are not provided in the first embodiment.

Therefore, except for the difference relating to the focal position correcting device, functions and effects similar to those of the first embodiment are obtained, and variations similar to those of the first embodiment are also possible.

Third Embodiment

Below, an image inspection system of a third embodiment of the present invention will be explained.

The image inspection system of the present embodiment has a structure similar to that of the first embodiment, but the focal position correcting device is implemented by a control section 16 instead of the color compensating device 103.

In the following simple explanation, distinctive features in comparison with the first embodiment are mainly described.

In the present embodiment, after autofocusing toward the first target focal position is performed, the control section 16 outputs a control signal to the focusing motor driving section 19, so as to command movement by a distance defined by the offset value $\Delta h_1$ and set the second target focal position.

Therefore, the specimen moving stage 17 is first moved to the first target focal position detected by the focal position detecting section 102, and then moved to the second target focal position set by the control section 16.

In accordance with the image inspection system of the present embodiment, the present invention can be easily implemented by only performing moving control based on the offset value in a system having a storage section 3 for storing the condition information, without providing a movable portion in the focal position detecting section 102 so as to make it possible to change the target focal position.

In the above explanations, $\Delta h_1$ or $\Delta h_2$ is included in the condition information as an offset value. However, in the first or the second embodiment, such an offset value on the object side may of course be converted to an amount of movement on the image surface side for actually moving the set of color compensating lenses 31 or the photodetector 36, and converted data may be stored.

In the focal position moving mechanism of the above embodiments, the mount stage is moved with respect to the observation optical system; however, the observation optical system may be moved with respect to the mount stage.

Additionally, in the above explanations, the observation light is visible light and the detection light is infrared light. However, the observation light and the detection light may have any wavelength if the detection light can branch away from the observation optical system so as not to disturb observation.

For example, DUV (deep ultraviolet) light may be used as the observation light. In this case, depth of field is deeper in comparison with visible light; thus, a considerably defocused image is obtained without performing correction of the focal position. Even in such a case, in accordance with the present invention, the focal position can be minutely moved in accordance with necessity, thereby improving accuracy and efficiency of inspection.

Also in the above explanations, the focal position detecting mechanism employs the so-called knife edge method. However, the method is not limited to the knife edge method, and another autofocusing method may be used, in which the focal position (i.e., the first target focal position) can be changed in accordance with the subject or the manufacturing process applied to the subject, and the first target focal position can be fixed under specific conditions.

For example, a contrast method may be used, in which the first target focal position is set to a position where the contrast of the image is at a maximum.

In this method, the first target focal position tends to be limited. However, in accordance with the present invention, the inspected position (i.e., the second target focal position) can be freely set at any depth.

In every embodiment described above, the color compensating device is provided. However, in the second or the third embodiment, the color compensating device may be omitted if there is no difference (or dispersion) in chromatic aberration between the objective lenses, or no difference between the wavelengths of the observation light and the detection light.

Also in every embodiment, the image inspection system is an independent system. However, the image inspection system may be a constituent of a macro inspection system or of a micro inspection system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In accordance with the present invention, condition setting data relating to a subject to be inspected can be retrieved from the storage section so as to set conditions for inspection, and the first target focal position can be detected by the target focal position detecting mechanism using light reflected by the subject.

Additionally, in accordance with the offset value stored in the storage section as the condition setting data, the focal position correcting device can determine the second target focal position which is offset from the first target focal position.

The focal position moving mechanism can be driven so as to focus on the second target focal position, so that the position between the subject on the mount stage and the observation optical system in the depth direction of focus can be shifted to the second target focal position.

When the offset value determined depending on each subject is stored as described above, it is possible to automatically focus on an appropriate position to be inspected without manually moving the focal position from the first target focal position. That is, even when the kind of the subject to be inspected or the manufacturing process is changed, the second target focal position can be set in accordance with the offset value stored in the storage section, thereby automatically correcting the second target focal position and improving efficiency of inspection.

The offset value may be zero.

Preferably, in the image inspection system of the present invention, the storage section stores a plurality of the offset values; and the focal position correcting device selects one of said plurality of the offset values in accordance with a part to be inspected of the subject, so as to determine the second target focal position.

In this case, one of the plurality of offset values is selected; thus, the second target focal position can be changed, thereby focusing on an appropriate position to be inspected for each target part of inspection.

The plurality of offset values can be assigned to divided portions of a target part of the subject in consideration of focusing accuracy. For example, when necessary offset values with respect to the target part do not vary very much, the subject may be divided into two or four parts. If the subject is a semiconductor wafer, an offset value may be assigned to each die.

Preferably, the image inspection system of the present invention has a design condition reference section for referring to a design condition of the subject; and a correction value computing section for computing the offset value by using the design condition referred to by the design condition reference section.

In this case, the offset value is computed by the correction value computing section by using the design condition referred to by the design condition reference section, thereby easily setting the offset value.

The design condition of the subject may be a layered structure, a height, a layer thickness, a material, reflectance, refractive index, a pattern, or the like of an inspected part.

The design conditions may be stored as an appropriate data table, or design or manufacturing data, such as CAD data supplied to a manufacturing system for the subject when the design conditions are to be referred to by the design condition reference section.

Also, preferably, the image inspection system further includes:

a measured value reference section for referring to a measured value with respect to a shape of the subject, the value being obtained by measuring the subject along a thickness thereof; and a correction value computing section for computing the offset value by the measured value referred to by the measured value reference section.

In this case, the offset value is computed by the correction value computing section by using the measured value with respect to the shape of the subject (measured along the thickness of the subject), referred to by the measured value reference section. Therefore, it is possible to appropriately set the second target focal position based on the measured shape.

The measured value with respect to the shape of the subject (measured in the thickness direction) may be a height of a boundary surface from a predetermined position, or a layer thickness between boundary surfaces.

Preferably, the image inspection system may further include:

a light branching device for making light reflected by the subject branch away from the observation optical system, wherein:

the focal position detecting mechanism has a correction optical system for imaging light branching away via the light branching device, where the correction optical system is movably arranged along the optical axis; and the focal position correcting device determines the second target focal position by moving the correction optical system along the optical axis.

In this case, in the focal position detecting mechanism, the correction optical system for imaging light branching away via the light branching device is movably arranged along the optical axis. Therefore, the correction optical system can be moved so as to move the image surface of light from the subject, thereby forcibly moving the target focal position from the first target focal position to the second target focal position.

Therefore, it is unnecessary to drive the observation optical system toward the first target focal position and then move the observation optical system so as to focus on the second target focal position, thereby allowing the quick performance of focusing and improving efficiency of inspection.

When the above correction optical system is provided in the image inspection system of the present invention, preferably, the correction optical system also functions as a color compensating device for correcting the first target focal position in accordance with the observation optical system, based on a wavelength difference between light of a detection light source used for the focal position detecting mechanism and light of an observation light source used for the observation optical system.

In this case, the correction optical system also functions as a color compensating device, thereby reducing the number of necessary parts.

Preferably, in the image inspection system of the present invention:

the focal position detecting mechanism has a position detection reference surface which is movable along the optical axis; and the focal position correcting device determines the second target focal position by moving the position detection reference surface along the optical axis.

In this case, the position detection reference surface of the focal position detecting mechanism is moved by the focal position correcting device, thereby forcibly moving the target focal position from the first target focal position to the second target focal position.

Therefore, it is unnecessary to drive the observation optical system toward the first target focal position and then move the observation optical system so as to focus on the second target focal position, thereby allowing the quick performance of focusing and improving the efficiency of inspection.

Also preferably, in the image inspection system of the present invention, after the focal position moving mechanism is driven so as to focus on the first target focal position in the observation optical system, the focal position correcting device determines the second target focal position by setting an amount of movement using the focal position moving mechanism corresponding to the offset value.

In this case, after the focal position moving mechanism is driven so as to focus on the first target focal position in the observation optical system, the second target focal position corresponding to the offset value is determined, and the focal position moving mechanism is driven based on the determined value. Therefore, the focal position detecting mechanism does not need a movable mechanism or the like for changing a target value for focusing of the focal position detecting mechanism, thereby providing a simple system structure.

Also preferably, the image inspection system of the present invention further includes:

a light branching device for making light reflected by the subject branch away from the observation optical system, wherein the focal position detecting mechanism detects the first target focal position by using light branching away via the light branching device.

The offset value may be an experimentally specified value, or may be specified in a manner such that the second target focal position is within a depth of focus of the observation optical system.

In addition, the focal position detecting mechanism may detect the first target focal position using the knife edge method.

What is claimed is:

1. An image inspection system comprising:
   a mount stage on which a subject to be inspected is mounted;
   an observation optical system for imaging light reflected by the subject so as to observe the object;
   a focal position moving mechanism for relatively moving a position of the observation optical system in a depth direction of focus with respect to the subject on the mount stage;
   a light branching device for making light reflected by the subject on the mount stage branch away from the observation optical system;
   a focal position detecting mechanism for detecting a first target focal position with respect to the subject by using light branching away via the light branching device, wherein the focal position detecting mechanism has a correction optical system for imaging the light branching away via the light branching device, and the correction optical system is movably arranged along the optical axis;
   a focal position correcting device for determining a second target focal position with respect to the subject, wherein the second target focal position is offset from the first target focal position;
   a driving device for driving the focal position moving mechanism so as to focus on the second target focal position; and
   a storage section for storing condition setting data for each subject, which includes at least one offset value for determining the second target focal position,
   wherein the focal position correcting device determines the second target focal position by moving the correction optical system along the optical axis in accordance with one of said at least one offset value in the condition setting data.

2. The image inspection system according to claim 1, wherein:
   the storage section stores a plurality of offset values; and
   the focal position correcting device selects one of said plurality of offset values in accordance with a part to be inspected of the subject, so as to determine the second target focal position.

3. The image inspection system according to claim 1, further comprising:
   a design condition reference section for referring to a design condition of the subject; and
   a correction value computing section for computing the offset value by using the design condition referred to by the design condition reference section.

4. The image inspection system according to claim 1, further comprising:
- a measured value reference section for referring to a measured value with respect to a shape of the subject, the value being obtained by measuring the subject along a thickness thereof; and
- a correction value computing section for computing the offset value by the 15 measured value referred to by the measured value reference section.

5. The image inspection system according to claim 1, wherein the correction optical system also functions as a color compensating device for correcting the first target focal position in accordance with the observation optical system, based on a wavelength difference between light of a detection light source used for the focal position detecting mechanism and light of an observation light source used for the observation optical system.

6. The image inspection system according to claim 1, wherein the focal position detecting mechanism detects the first target focal position by using the light branching away via the light branching device.

7. The image inspection system according to claim 1, wherein the offset value is an experimentally specified value.

8. The image inspection system according to claim 1, wherein the offset value is specified in a manner such that the second target focal position is within a depth of focus of the observation optical system.

9. The image inspection system according to claim 1, wherein the focal position detecting mechanism detects the first target focal position using a knife edge method.

* * * * *